United States Patent
Zhou et al.

(10) Patent No.: US 12,333,265 B2
(45) Date of Patent: Jun. 17, 2025

(54) SIGN LANGUAGE INTERPRETATION WITH COLLABORATIVE AGENTS

(71) Applicant: Snap Inc., Santa Monica, CA (US)

(72) Inventors: Kai Zhou, Wiener Neudorf (AT); Jennica Pounds, Cape Coral, FL (US); Zsolt Robotka, Budapest (HU); Márton Gergely Kajtár, Felsopakony (HU)

(73) Assignee: Snap Inc., Santa Monica, CA (US)

( * ) Notice: Subject to any disclaimer, the term of this patent is extended or adjusted under 35 U.S.C. 154(b) by 267 days.

(21) Appl. No.: 17/967,209

(22) Filed: Oct. 17, 2022

(65) Prior Publication Data

US 2024/0127006 A1 Apr. 18, 2024

(51) Int. Cl.
*G06F 40/58* (2020.01)
*G06F 3/01* (2006.01)
(Continued)

(52) U.S. Cl.
CPC .............. *G06F 40/58* (2020.01); *G06F 3/014* (2013.01); *G06F 3/017* (2013.01); *G06F 3/0346* (2013.01);
(Continued)

(58) Field of Classification Search
CPC ........... G06F 40/58; G06F 3/017; G06F 3/011
See application file for complete search history.

(56) References Cited

U.S. PATENT DOCUMENTS 7,755,669 B2 * 7/2010 Shiomi .................. H04N 25/75
348/222.1
8,868,409 B1 * 10/2014 Mengibar ............... G06F 40/30
704/250
(Continued)

FOREIGN PATENT DOCUMENTS

WO 2015143114 9/2015
WO 2018052901 3/2018

OTHER PUBLICATIONS

"International Application Serial No. PCT US2023 077007, International Search Report mailed Feb. 6, 2024", 3 pgs.
(Continued)

*Primary Examiner* — Daniel C Washburn
*Assistant Examiner* — Paul J. Mueller
(74) *Attorney, Agent, or Firm* — Schwegman Lundberg & Woessner, P.A.

(57) ABSTRACT

A method for recognizing sign language using collaborative augmented reality devices is described. In one aspect, a method includes accessing a first image generated by a first augmented reality device and a second image generated by a second augmented reality device, the first image and the second image depicting a hand gesture of a user of the first augmented reality device, synchronizing the first augmented reality device with the second augmented reality device, in response to the synchronizing, distributing one or more processes of a sign language recognition system between the first and second augmented reality devices, collecting results from the one or more processes from the first and second
(Continued)

augmented reality devices, and displaying, in near real-time in a first display of the first augmented reality device, text indicating a sign language translation of the hand gesture based on the results.

20 Claims, 13 Drawing Sheets

(51) Int. Cl.
| | |
|---|---|
| *G06F 3/0346* | (2013.01) |
| *G06V 10/26* | (2022.01) |
| *G06V 20/20* | (2022.01) |
| *G06V 40/10* | (2022.01) |
| *G06V 40/20* | (2022.01) |

(52) U.S. Cl.
CPC .............. *G06V 10/26* (2022.01); *G06V 20/20* (2022.01); *G06V 40/113* (2022.01); *G06V 40/28* (2022.01)

(56) References Cited

U.S. PATENT DOCUMENTS

| | | | |
|---|---|---|---|
| 9,280,972 | B2 | 3/2016 | Mcculloch et al. |
| 9,436,870 | B1* | 9/2016 | Mangiat ................ G06V 40/161 |
| 11,539,801 | B1* | 12/2022 | Noskin ................. H04L 65/762 |
| 2016/0027218 | A1 | 1/2016 | Salter et al. |
| 2018/0075659 | A1* | 3/2018 | Browy .................... G06F 3/013 |
| 2019/0259170 | A1* | 8/2019 | Qi ............................. G06T 7/73 |
| 2019/0282324 | A1* | 9/2019 | Freeman ............... A61H 31/005 |
| 2020/0261799 | A1* | 8/2020 | Cahill ...................... A63F 13/50 |
| 2021/0358330 | A1 | 11/2021 | Johnson et al. |
| 2022/0051021 | A1* | 2/2022 | Rai ........................ G06V 20/46 |
| 2022/0358326 | A1* | 11/2022 | Zhou .......................... G06T 7/73 |

OTHER PUBLICATIONS

"International Application Serial No. PCT US2023 077007, Written Opinion mailed Feb. 6, 2024", 4 pgs.

* cited by examiner

SIGN LANGUAGE INTERPRETATION WITH COLLABORATIVE AGENTS

TECHNICAL FIELD

The subject matter disclosed herein generally relates to an augmented reality (AR) device. Specifically, the present disclosure addresses systems and methods for sign language interpretation using collaborative agents.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
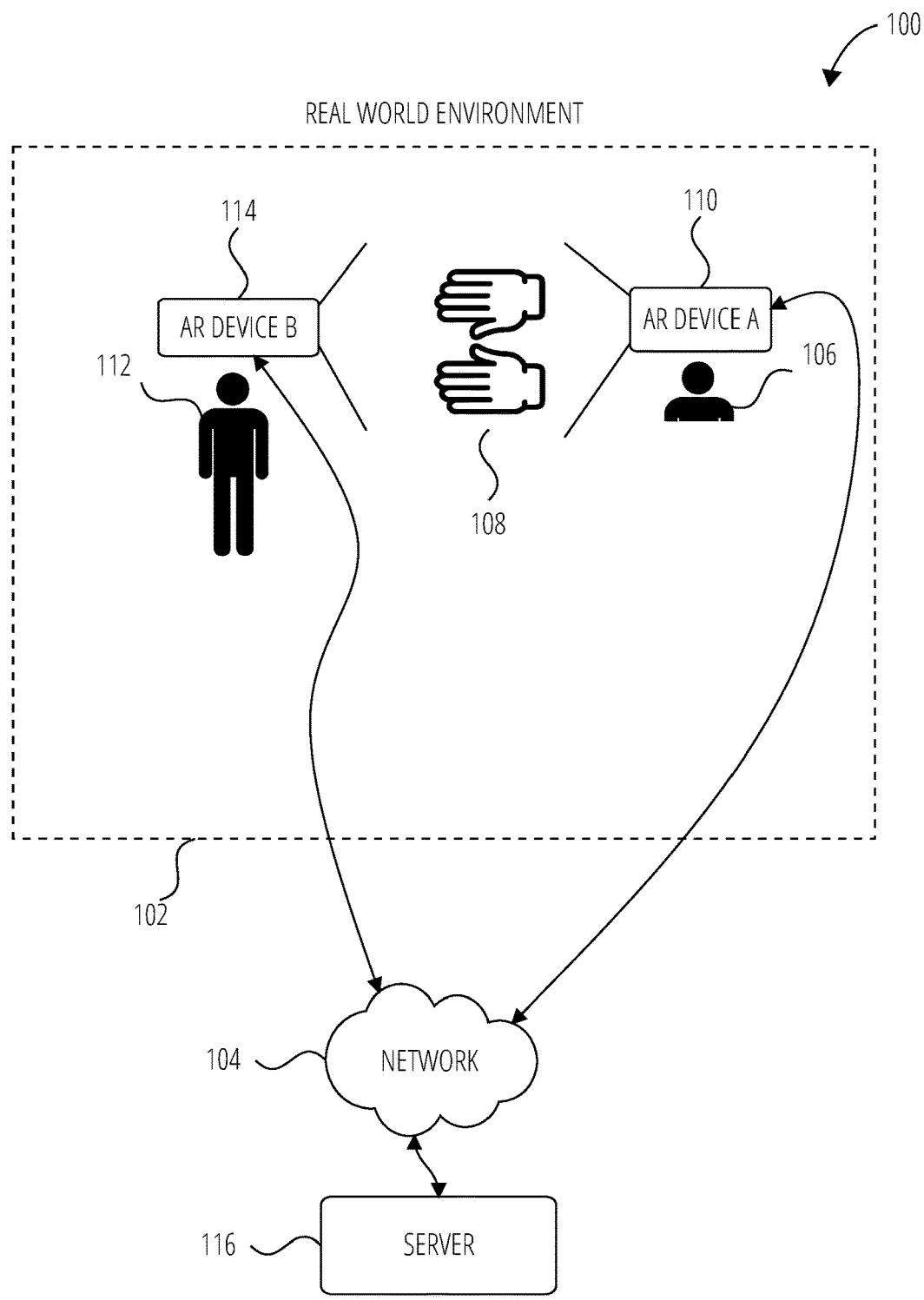
FIG. 1 is a block diagram illustrating a network environment for sign language translation using collaborating augmented reality devices in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically and up or down. The 6DOF tracking system may include a Simultaneous Localization and Mapping (SLAM) system and/or a VIO system that relies on data acquired from multiple sensors (e.g., depth cameras, inertial sensors). The 6DOF tracking system analyzes data from the sensors to accurately determine the pose of the display device.

The present application describes a system for translating sign language using collaborative augmented reality devices. For example, a first user wears a head-wearable AR device (e.g., smart glasses) and performs hand gesture (e.g., sign language). A second user facing the first user can also wear another AR device or can point a camera of his/her mobile communication device (e.g., smart phone) towards the hands of the first user. The cameras from the AR devices of the first and second users capture the hand gestures of the first user from different perspective or angles. The first AR device is first synchronized with the second AR device. For example, synchronization can be based on the timestamps of the images generated by the cameras of the first and second AR devices. In another example, synchronization can be based on the poses of the AR devices in same registered coordinate system. One or more processes of the sign language translation system is distributed among the first and second AR devices. For example, the first AR device can share images of the hand gesture captured with the camera of the first AR device to the second AR device. The second AR device may have more computational resources (e.g., a smart phone may have a faster processor, larger memory, and larger battery than smart glasses) and performs hand tracking, gesture recognition, and sign language translation. In one example, the distribution of the processes of the sign language translation system can be based on a comparison of the specifications of the first AR device and second AR device and other conditions (e.g., detection of occlusion of hands from camera of the first AR device; the system will rely on images from cameras of the second AR device when the hands are occluded in the cameras of the first AR device).

In other example embodiments, one AR device performs hand tracking and gesture recognition, and the other AR device performs gesture recognition. In other examples, results of the processes (sign language translation, hand skeleton detection, semantic gesture recognition) is shared between the AR devices temporally (e.g., every other frame) or spatially (e.g. left/right hand only). In another example, the first AR device displays suggested words/phrases according to the contextual information, user's history inputs, text corpus, pre-defined terms. Upon detection of a triggering condition (special gesture or actuation of the user input), the first user can select the suggested options to avoid the fingerspelling or speed up interpretation.

In one example embodiment, a method for recognizing sign language using collaborative AR devices is described. In one aspect, the method includes accessing a first image generated by a first camera of a first augmented reality device and a second image generated by a second camera of a second augmented reality device, the first image and the second image depicting a hand gesture of a user of the first augmented reality device, synchronizing the first augmented reality device with the second augmented reality device, in response to synchronizing, distributing one or more processes of a sign language recognition system between the first augmented reality device and the second augmented reality device, where the one or more processes are performed on a corresponding augmented reality device, collecting results from the one or more processes from the first augmented reality device and from the second augmented reality device, and displaying, in near real-time in a first display of the first augmented reality device or in a second display of the second augmented reality device, text indicating a sign language translation of the hand gesture based on the results.

As a result, one or more of the methodologies described herein facilitate solving the technical problem of resource management of sign language translation. The presently described method provides an improvement to an operation of the functioning of a computer by distributing sign language processes among synchronized collaborative AR devices to provide power consumption reduction. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a block diagram illustrating a network environment 100 for sign language translation using collaborating AR devices in accordance with one example embodiment. The network environment 100 includes the AR device B 114, the AR device A 110, and the server 116, communicatively coupled to each other via a network 104. The AR device B 114, AR device A 110, and the server 116 may each be implemented in a computer system, in whole or in part, as described below with respect to FIG. 13. The server 116 may be part of a network-based system. For example, the network-based system may be or include a cloud-based server system that provides additional information, such as reference frame alignment data of the AR device B 114 and the AR device A 110.

A user 106 wears the AR device A 110 (e.g., smart glasses) and operates the AR device A 110 via voice, hand gesture, physical input (e.g., touching a surface of the AR device A 110 or pressing on a button on the AR device A 110). The user 106 performs hand gestures with his/her hands 108. The AR device A 110 captures an image of the hands 108 using a camera (not shown) of the AR device A 110. The AR device A 110 may be a computing device with a display. The computing device may be removable mounted to a head of the user 106. In one example, the display may be a screen that displays what is captured with a camera of the AR device B 114/AR device A 110. In another example, the display of the device may be transparent, such as in lenses of wearable computing glasses, that allow the user 106 to view content presented on the display while simultaneously viewing real world object visible through the display.

A user 112 operates the AR device B 114. The user 112 may be a human user (e.g., a human being), a machine user (e.g., a computer configured by a software program to interact with the AR device B 114), or any suitable combination thereof (e.g., a human assisted by a machine or a machine supervised by a human). In one example, the user 112 aims a camera of the AR device B 114 at the hands 108 of the user 106 in the real world environment 102. The AR device B 114 may be a computing device with a display such as a smartphone, a tablet computer, or a wearable computing device (e.g., watch or glasses). The computing device may be hand-held or may be removable mounted to a head of the user 112). In one example, the display may be a screen that displays what is captured with a camera of the AR device B 114/AR device A 110. In another example, the display of the device may be transparent, such as in lenses of wearable computing glasses, that allow the user 112 to view content presented on the display while simultaneously viewing real world object visible through the display. In another example, the AR device B 114 includes a computing device (e.g., a mobile device capable of displaying text or playing audio).

In one example, the AR device A 110 and AR device B 114 each generate an image of the hands 108 from different viewpoints. As such, the images captured by the AR device B 114 and the AR device A 110 include overlapping regions.

The AR device A 110 includes a tracking system (not shown). The tracking system tracks the pose (e.g., position and orientation) of the AR device A 110 relative to the real world environment 102 using optical sensors (e.g., image camera), inertia sensors (e.g., gyroscope, accelerometer), wireless sensors (Bluetooth, Wi-Fi), GPS sensor, and audio sensor to determine the location of the AR device A 110 within the real world environment 102. For example, the tracking system of the AR device A 110 includes a 6DOF tracking system that tracks whether the user 106 has rotated their head and moved forward or backward, laterally or vertically and up or down.

The AR device B 114 also includes a tracking system (not shown). The tracking system tracks the pose (e.g., position and orientation) of the AR device B 114 relative to the real world environment 102 using optical sensors (e.g., image camera), inertia sensors (e.g., gyroscope, accelerometer), wireless sensors (Bluetooth, Wi-Fi), GPS sensor, and audio sensor to determine the location of the AR device B 114 within the real world environment 102. For example, the tracking system of the AR device B 114 includes a 6DOF tracking system that tracks whether the user 112 (in the case of a head-wearable device) has rotated their head and moved forward or backward, laterally or vertically and up or down.

In one example embodiment, the server 116 coordinates the distribution of sign language translation between the AR device B 114 and the AR device A 110. For example, the server 116 identifies the available computational resources and technical specifications of the AR device B 114 and AR device A 110, allocates one or more processes from the sign language translation to the AR device B 114 and AR device A 110 based on the available computational resources and technical specifications. In another example, the server 116 receives image data, image metadata (e.g., timestamp), and pose information from both the AR device B 114 and AR device A 110, synchronizes the receiving information, performs the sign language translation based on the synchronized information, and provides a translation to both the AR device B 114 and the AR device A 110. In another example, the server 116 provides a suggested translation to the AR device A 110 first, waits for the user 106 to confirm the suggested translation before sending the confirmed translation to the AR device B 114.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 116), databases, and devices (e.g., AR device B 114, AR device A 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
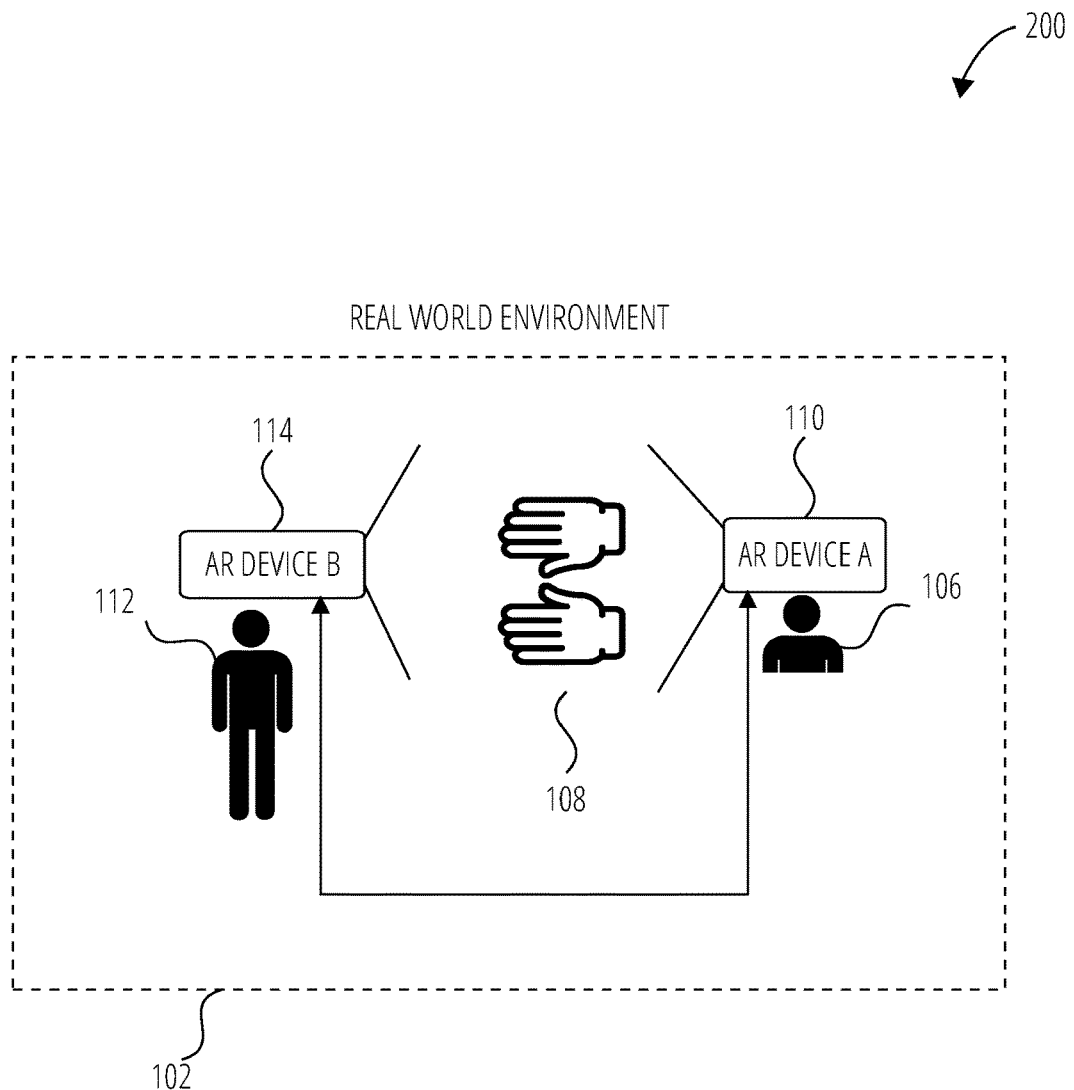
FIG. 2 is a block diagram illustrating a network environment for sign language translation using collaborating augmented reality devices in accordance with one example embodiment.

FIG. 2 is a network diagram illustrating a network environment 200 suitable for operating AR device B 114 and AR device A 110, according to some example embodiments. The network environment 200 includes AR device B 114 and AR device A 110. The AR device B 114 may communicate wirelessly (e.g., Bluetooth) with the AR device A 110. In contrast to FIG. 1, the AR device B 114 and AR device A 110 communicate directly with each other.

The AR device A 110 and the AR device B 114 may share data with each other. In one example, the AR device A 110 receives image data, pose data from the AR device B 114 and synchronizes the AR device A 110 with the AR device B 114 based on the received data from AR device B 114 and the image data and pose data of the AR device A 110. In another example, the AR device B 114 receives image data, pose data from the AR device B 114 and synchronizes the AR device B 114 with the AR device A 110 based on the received data from AR device A 110 and the image data and pose data of the AR device B 114.

Figure 3:
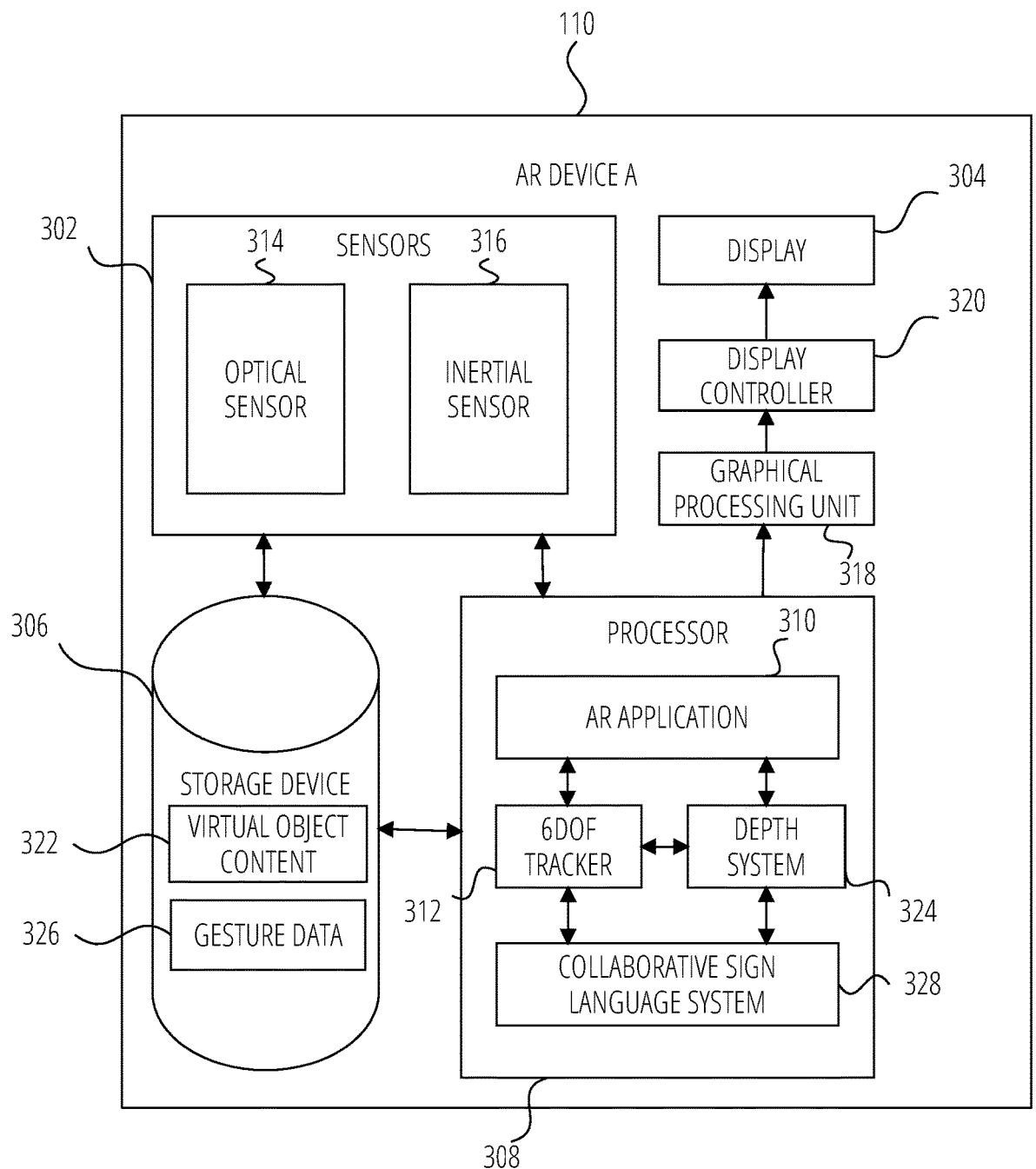
FIG. 3 is a block diagram illustrating an augmented reality device in accordance with one example embodiment.

FIG. 3 is a block diagram illustrating modules (e.g., components) of the AR device A 110, according to some example embodiments. The AR device A 110 includes sensors 302, a display 304, a processor 308, a Graphical processing unit 318, a display controller 320, and a storage device 306. Examples of the AR device A 110 includes a wearable computing device. AR device B 114 includes components similar to AR device A 110. However, AR device B 114 can include a wearable computing device, a tablet computer, or a smart phone.

The sensors 302 include an optical sensor 314 and an inertial sensor 316. The optical sensor 314 includes stereo cameras. The inertial sensor 316 includes a combination of gyroscope, accelerometer, magnetometer. Other examples of sensors 302 include a proximity or location sensor (e.g., near field communication, GPS, Bluetooth, Wifi), an audio sensor (e.g., a microphone), or any suitable combination thereof. It is noted that the sensors 302 described herein are for illustration purposes and the sensors 302 are thus not limited to the ones described above. In one example embodiment, the sensors 302 can include a depth sensor such as a structured-light sensor, a time-of-flight sensor, passive stereo sensor, and an ultrasound device, time-of-flight sensor.

The display 304 includes a screen or monitor configured to display images generated by the processor 308. In one example embodiment, the display 304 may be transparent or semi-transparent so that the user 106 can see through the display 304 (in AR use case). In another example, the display 304, such as a LCOS display, presents each frame of virtual content in multiple presentations.

The processor 308 includes an AR application 310, a 6DOF tracker 312, a depth system 324, and a collaborative sign language system 328. The AR application 310 detects and identifies the hands 108 or an item in the real world environment 102 using computer vision. The AR application 310 retrieves a virtual object (e.g., 3D object model) based on an identified item (e.g., hands 108) or physical environment. The display 304 displays the virtual object. The AR application 310 includes a local rendering engine that generates a visualization of a virtual object overlaid (e.g., superimposed upon, or otherwise displayed in tandem with) on an image of the item captured by the optical sensor 314. A visualization of the virtual object may be manipulated by adjusting a position of the item (e.g., its physical location, orientation, or both) relative to the optical sensor 314. Similarly, the visualization of the virtual object may be manipulated by adjusting a pose of the AR device A 110 relative to the item.

The 6DOF tracker 312 estimates a pose of the AR device A 110. For example, the 6DOF tracker 312 uses image data and corresponding inertial data from the optical sensor 314 and the inertial sensor 316 to track a location and pose of the AR device A 110 relative to a frame of reference (e.g., real world environment 102). In one example, the 6DOF tracker 312 uses the sensor data to determine the three-dimensional pose of the AR device A 110. The three-dimensional pose is a determined orientation and position of the AR device A 110 in relation to the user's real world environment 102. For example, the AR device A 110 may use images of the user's real world environment 102, as well as other sensor data to identify a relative position and orientation of the AR device A 110 from physical objects in the real world environment 102 surrounding the AR device A 110. The 6DOF tracker 312 continually gathers and uses updated sensor data describing movements of the AR device A 110 to determine updated three-dimensional poses of the AR device A 110 that indicate changes in the relative position and orientation of the AR device A 110 from the physical objects in the real world environment 102. The 6DOF tracker 312 provides the three-dimensional pose of the AR device A 110 to the depth system 324 and the collaborative sign language system 328.

The depth system 324 accesses images from the optical sensor 314 and sparse 3D points from the 6DOF tracker 312 to predict depths and generate a dense point cloud. In one example embodiment, the optical sensor 314 includes a depth sensor or a stereo sensor.

The collaborative sign language system 328 coordinates the distribution of processes of a sign language translation application between the AR device B 114 and the AR device A 110 (and optionally the server 116). For example, the collaborative sign language system 328 identifies the available computational resources and technical specifications of the AR device B 114 and AR device A 110, allocates one or more processes from the sign language translation between the AR device B 114 and AR device A 110 based on the available computational resources and technical specifications. In another example, the AR device A 110 receives image data, image metadata (e.g., timestamp), and pose information from the AR device B 114, synchronizes the AR device A 110 with the AR device B 114 using the receiving information, performs the sign language translation based on the synchronized information, displays the sign language translation in the display 304, and provides the sign language translation to the AR device B 114. In another example, the collaborative sign language system 328 displays a suggested translation in the display 304, waits for the user 106 to confirm the suggested translation, detects the confirmation by detecting a predefined gesture that indicate a sign language suggestion confirmation gesture, and sends the confirmed translation to the AR device B 114.

The Graphical processing unit 318 includes a render engine (not shown) that is configured to render a frame of a 3D model of a virtual object based on the virtual content provided by the AR application 310 and the pose of the AR device B 114 (relative to AR device A 110). In other words, the Graphical processing unit 318 uses the three-dimensional pose of the AR device B 114 to generate frames of virtual content to be presented on the display 304. For example, the Graphical processing unit 318 uses the three-dimensional pose to render a frame of the virtual content such that the virtual content is presented at an orientation and position in the display 304 to properly augment the user's reality. As an example, the Graphical processing unit 318 may use the three-dimensional pose data to render a frame of virtual content such that, when presented on the display 304, the virtual content overlaps with a physical object in the user's real world environment 102. The Graphical processing unit 318 generates updated frames of virtual content based on updated three-dimensional poses of the AR device B 114, which reflect changes in the position and orientation of the user in relation to physical objects in the user's real world environment 102.

The Graphical processing unit 318 transfers the rendered frame to the display controller 320. The display controller 320 is positioned as an intermediary between the Graphical processing unit 318 and the display 304, receives the image data (e.g., rendered frame) from the Graphical processing unit 318, provides the rendered frame to display 304.

The storage device 306 stores virtual object content 322 and gesture data 326 (e.g., predefined gesture indicating suggested word confirmation). The virtual object content 322 includes, for example, a database of visual references (e.g., images, QR codes) and corresponding virtual content (e.g., three-dimensional model of virtual objects). The gesture data 326 indicate predefined hand gestures or predefined user input to indicate a confirmation of suggested words translated by the collaborative sign language system 328 or by another translation system (located on the AR device B 114 or the server 116). The gesture data 326 can also define other triggering conditions that when detected enable the user 106 to select the suggested options to avoid the finger-spelling or speed up sign language interpretation.

Any one or more of the modules described herein may be implemented using hardware (e.g., a Processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
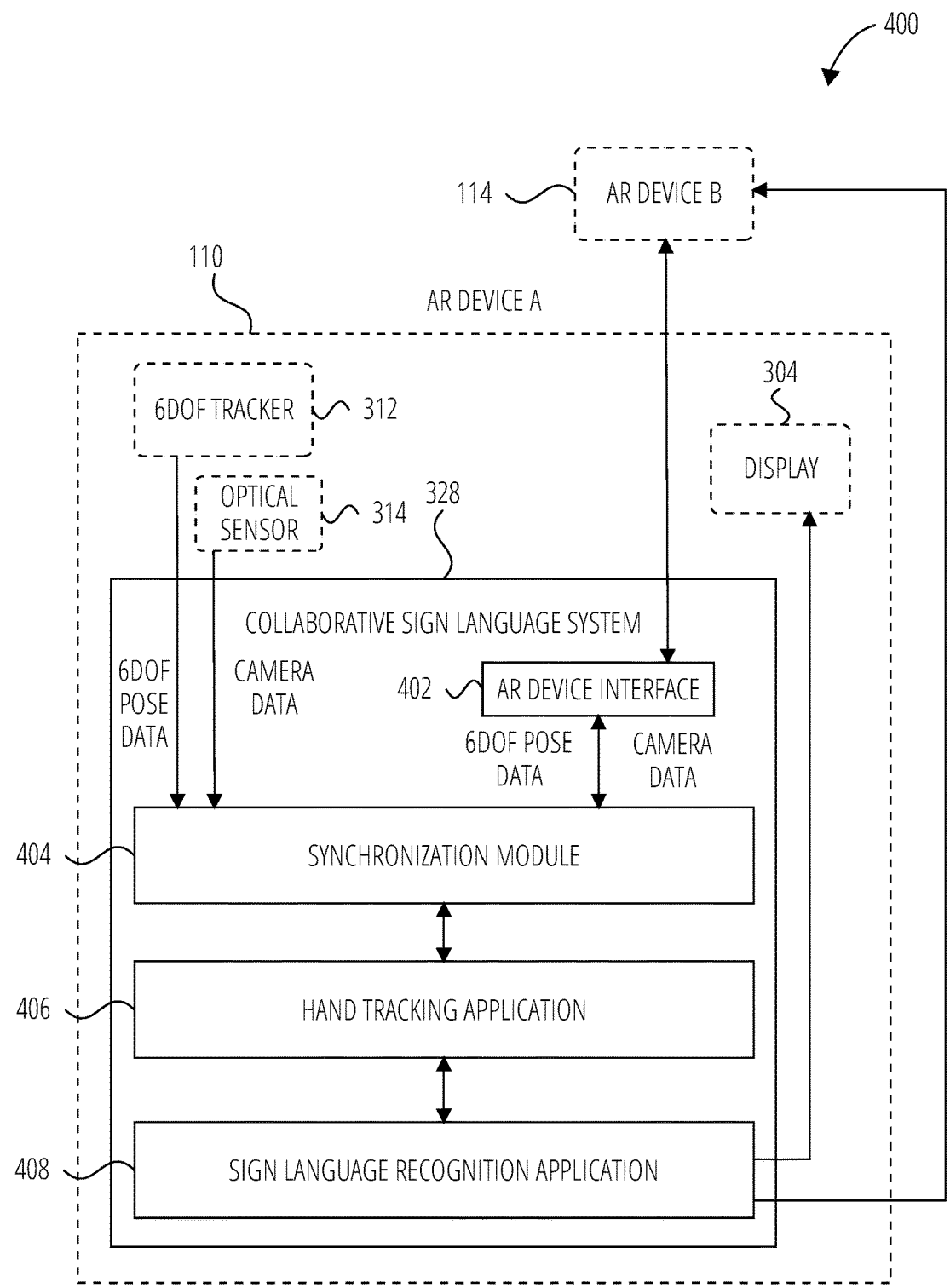
FIG. 4 is a block diagram illustrating a collaborative sign language system in accordance with one example embodiment.

FIG. 4 is a block diagram illustrating the collaborative sign language system 328 in accordance with one example embodiment. The collaborative sign language system 328 includes an AR device interface 402, a synchronization module 404, a hand tracking application 406, and a sign language recognition application 408.

The AR device interface 402 communicates with the AR device B 114. In one example, the AR device interface 402 accesses 6DoF pose data and camera data from the AR device B 114. In another example, the AR device interface 402 shares the 6DoF pose data of 6DOF tracker 312 and camera data of the optical sensor 314 to the AR device B 114. In another example, the AR device interface 402 communicates which processes the AR device B 114 is to perform as part of the collaborative sign language translation process.

The synchronization module 404 accesses the 6DOF pose data from 6DOF tracker 312 and the camera data from optical sensor 314, the 6DoF pose data and camera data (including timestamp metadata) from the AR device B 114. In another example, the synchronization module 404 accesses the technical specifications and available computation resources of AR device A 110 and AR device B 114. The synchronization module 404 synchronizes the AR device A 110 with the AR device B 114 by matching the timestamps of images from the AR device A 110 with images from the AR device B 114. In another example, the synchronization can be performed based on aligning/registering the 6DoF poses of the cameras of the AR device A 110 and the AR device B 114 in a same common coordinate system.

The hand tracking application 406 detects the hands 108 using computer vision. In one example, the hand tracking application 406 identifies features of the hands (motion, skeleton, depth) and tracks the motion of hands 108. The hand tracking application 406 can include a number of processes, such as for example, hand tracking process, hand gesture detection process, and sign language translation process.

The sign language recognition application 408 identifies a gesture of the hands 108 based on the hand tracking application 406 and identifies a word corresponding to the gesture. In one example, the sign language recognition application 408 includes a sign language translation process. In another example embodiment, the sign language recognition application 408 identifies a suggested word based on a combination of contextual information of the AR device A 110 (e.g., profile of the user 106, geo-location of the AR device A 110), historical inputs of the user 106, text corpus, and pre-defined terms). The sign language recognition application 408 provides text (indicating the suggested word) to the display 304. The display 304 displays the text. In another example, the sign language recognition application 408 communicates the text to the AR device B 114 where the text is displayed in a screen of the AR device B 114.

Figure 5:
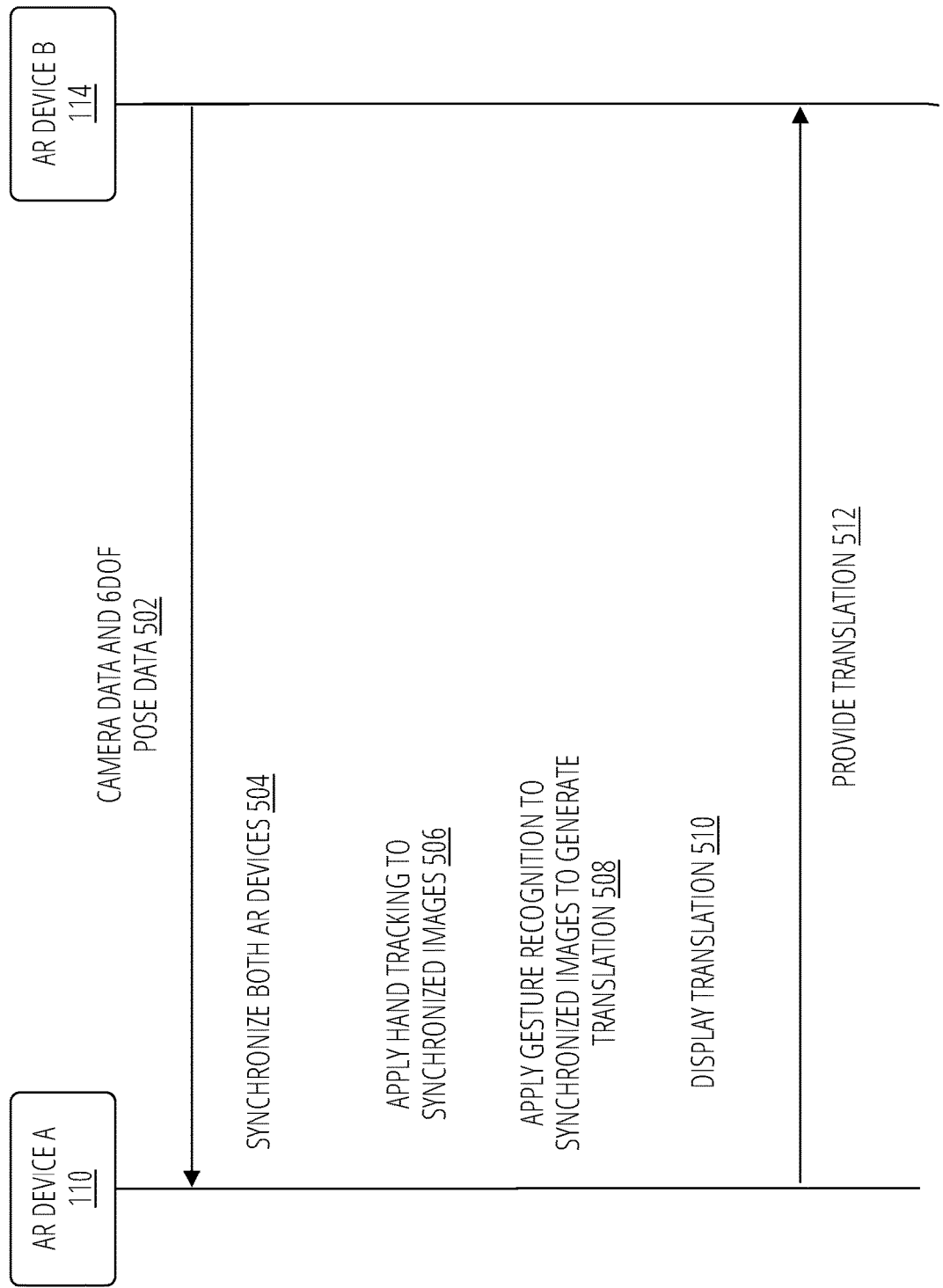
FIG. 5 is an interaction diagram illustrating interactions between collaborative augmented reality devices in accordance with one example embodiment.

FIG. 5 is an interaction diagram illustrating interactions between collaborative augmented reality devices (e.g., AR device A 110 and AR device B 114) in accordance with one example embodiment. The AR device B 114 captures images of the hands 108 with its camera. The AR device A 110 captures images of hands 108 with its camera. At 502, the AR device B 114 sends the images, camera data, and 6DoF pose data to the AR device A 110. At 504, the AR device A 110 synchronizes the AR device A 110 and the AR device B 114 based on the image data from both AR device A 110 and AR device B 114. At 506, the AR device A 110 applies a hand tracking process based on the synchronized images (e.g., a combination of image data from AR device A 110 and AR device B 114). At 508, the AR device A 110 applies a gesture recognition process to the synchronized images to generate sign language translation. At 510, the AR device A 110 displays the sign language translation in the display 304, and provides the sign language translation to the AR device B 114.

Figure 6:
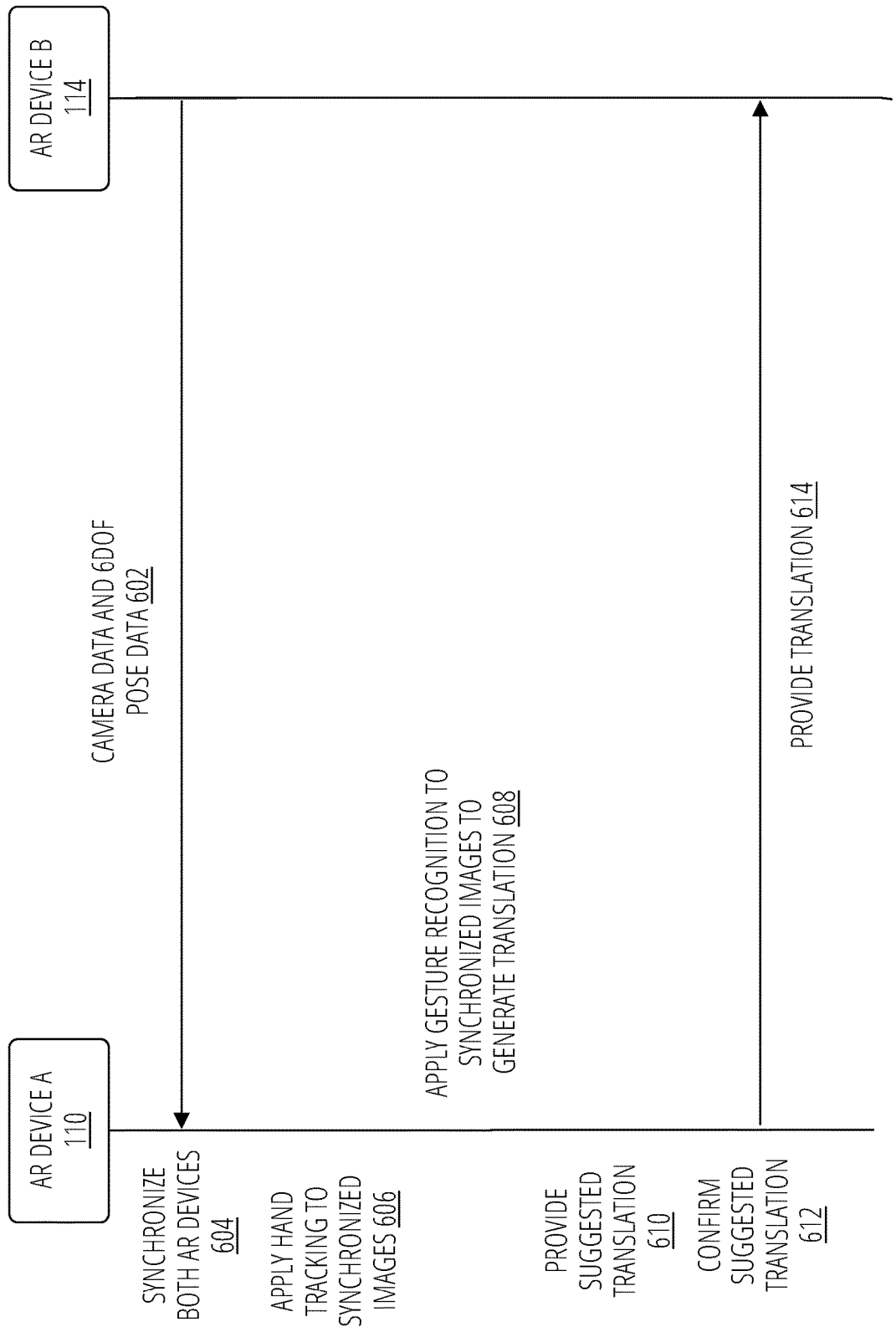
FIG. 6 is an interaction diagram illustrating interactions between collaborative augmented reality devices in accordance with one example embodiment.

FIG. 6 is an interaction diagram illustrating interactions between collaborative augmented reality devices (e.g., AR device A 110 and AR device B 114) in accordance with one example embodiment. The AR device B 114 captures images of the hands 108 with its camera. The AR device A 110 captures images of hands 108 with its camera. At 602, the AR device B 114 sends the images, camera data, and 6DoF pose data to the AR device A 110. At 604, the AR device A 110 synchronizes the AR device A 110 and the AR device B 114 based on the image data from both AR device A 110 and AR device B 114. At 606, the AR device A 110 applies a hand tracking process based on the synchronized images (e.g., a combination of image data from AR device A 110 and AR device B 114). At 608, the AR device A 110 applies a gesture recognition process to the synchronized images to generate a suggested sign language translation. At 610, the AR device A 110 displays the suggested translation to the user 106 in the display 304. At 612, the AR device A 110 detects a confirmation of the suggested translation to the user 106. At 614, the AR device A 110 shares the translation to the AR device B 114.

Figure 7:
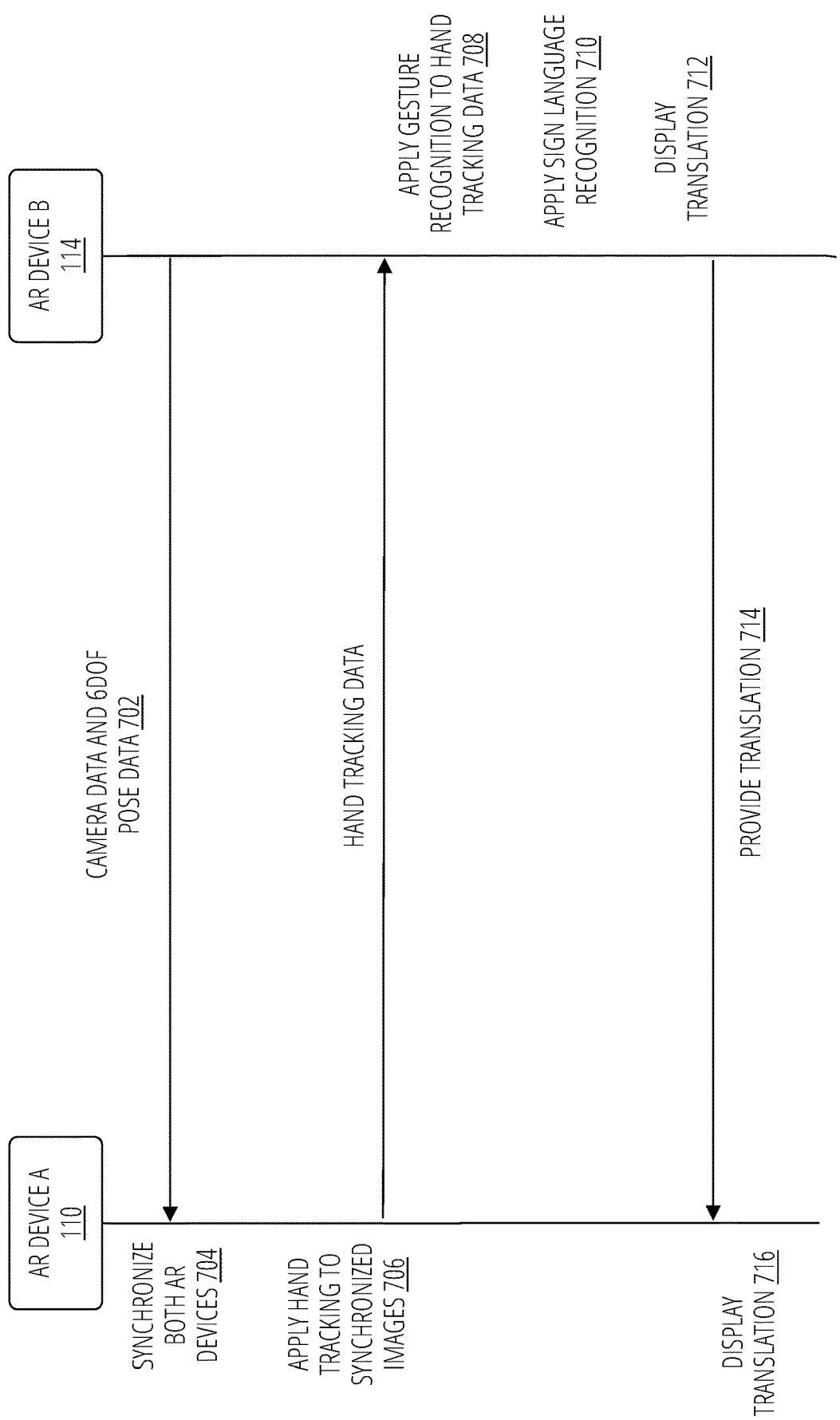
FIG. 7 is an interaction diagram illustrating interactions between collaborative augmented reality devices in accordance with one example embodiment.

FIG. 7 is an interaction diagram illustrating interactions between collaborative augmented reality devices (e.g., AR device A 110 and AR device B 114) in accordance with one example embodiment. The AR device B 114 captures images of the hands 108 with its camera. The AR device A 110 captures images of hands 108 with its camera. At 702, the AR device B 114 sends the images, camera data, and 6DoF pose data to the AR device A 110. At 704, the AR device A 110 synchronizes the AR device A 110 and the AR device B 114 based on the image data from both AR device A 110 and AR device B 114. At 706, the AR device A 110 applies a hand tracking process based on the synchronized images (e.g., a combination of image data from AR device A 110 and AR device B 114). The AR device A 110 sends the results of the hand tracking process to the AR device B 114. At 708, the AR device B 114 applies a gesture recognition process to the results of the hand tracking processed at AR device A 110. At 710, the AR device B 114 applies a sign language recognition process on the results of the gesture recognition process. At 712, the AR device B 114 displays the sign language translation (e.g., text) in a display of the AR device B 114. At 714, the AR device B 114 provides the text to AR device A 110. At 716, the AR device A 110 display the text.

Figure 8:
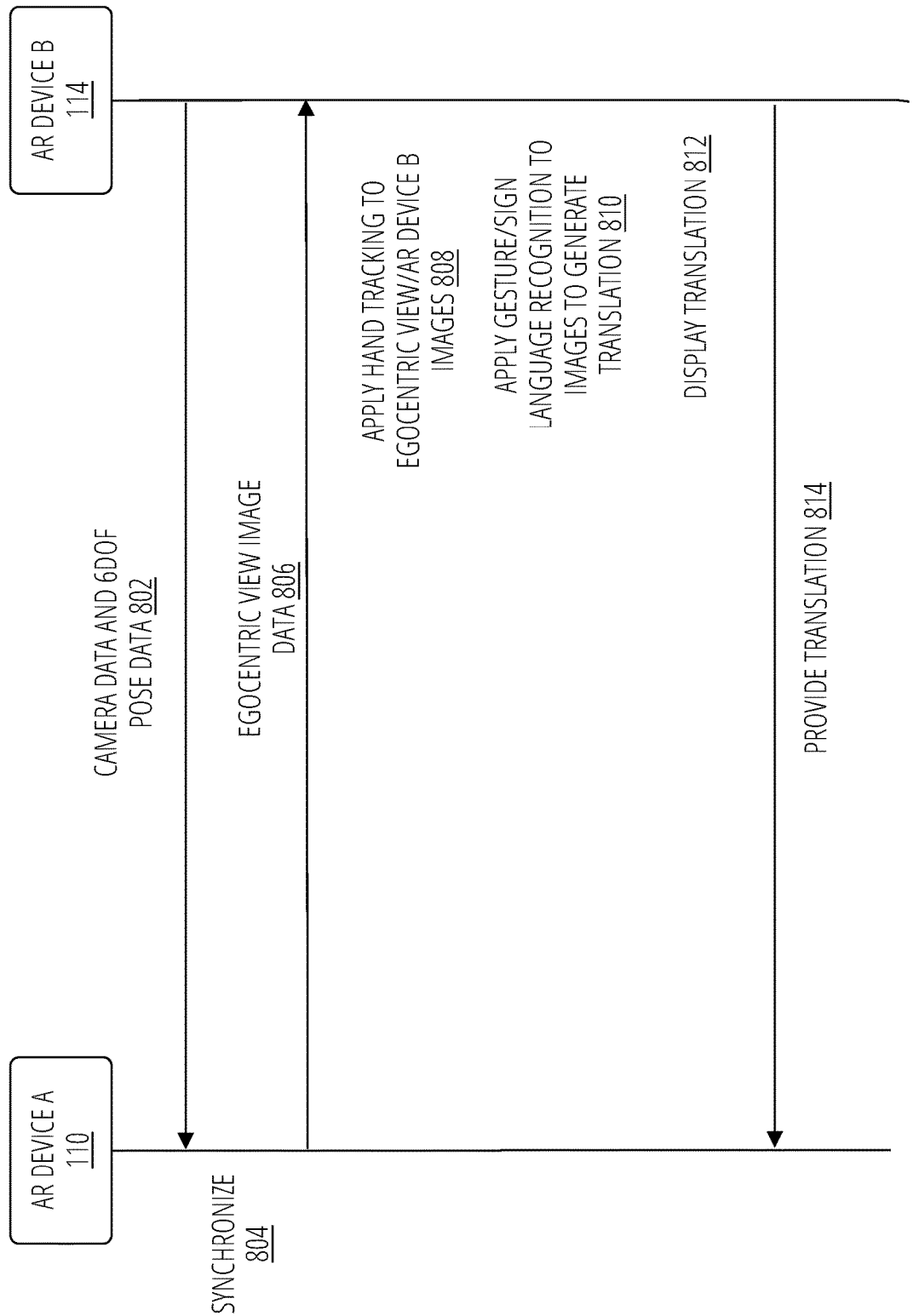
FIG. 8 is an interaction diagram illustrating interactions between collaborative augmented reality devices in accordance with one example embodiment.

FIG. 8 is an interaction diagram illustrating interactions between collaborative augmented reality devices (e.g., AR device A 110 and AR device B 114) in accordance with one example embodiment. The AR device B 114 captures images of the hands 108 with its camera. The AR device A 110 captures images of hands 108 with its camera. At 802, the AR device B 114 sends the images, camera data, and 6DoF pose data to the AR device A 110. At 804, the AR device A 110 synchronizes the AR device A 110 and the AR device B 114 based on the image data from both AR device A 110 and AR device B 114. At 806, the AR device A 110 provides an egocentric view image to the AR device B 114. At 808, the AR device A 110 applies a hand tracking process based on the synchronized images (e.g., a combination of image data from AR device B 114 and the egocentric view data from AR device A 110). At 810, the AR device B 114 applies a gesture recognition process and sign language recognition process to the results of the hand tracking process. At 812, the AR device B 114 displays the sign language translation (e.g., text) in a display of the AR device B 114. At 814, the AR device B 114 provides the text to AR device A 110 for display.

Figure 9:
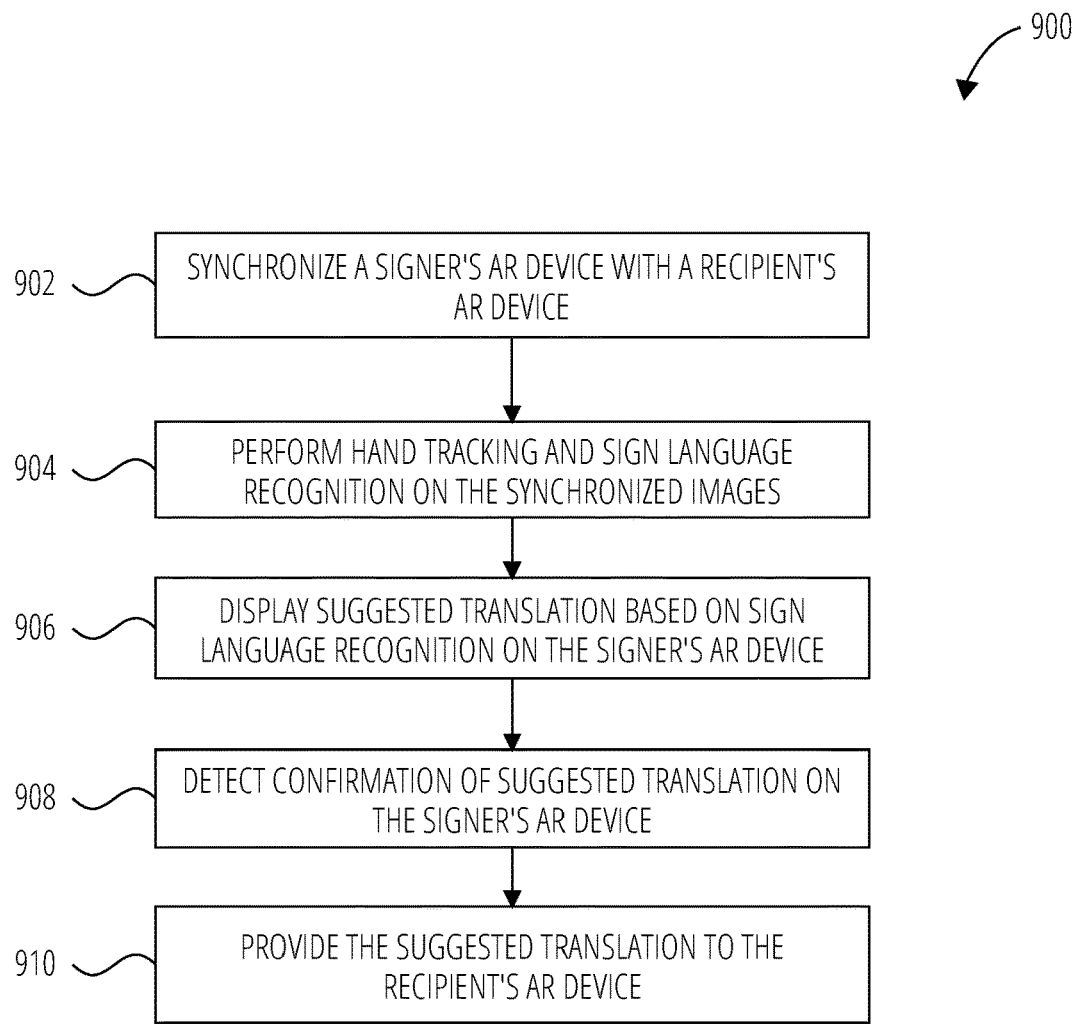
FIG. 9 is a flow diagram illustrating a method for sign language translation in accordance with one example embodiment.

FIG. 9 is a flow diagram illustrating a method 900 for sign language translation in accordance with one example embodiment. Operations in the method 900 may be performed by the collaborative sign language system 328, using components (e.g., modules, engines) described above with respect to FIG. 4. Accordingly, the method 900 is described by way of example with reference to the collaborative sign language system 328. However, it shall be appreciated that at least some of the operations of the method 900 may be deployed on various other hardware configurations or be performed by similar components residing elsewhere.

In block 902, the synchronization module 404 synchronizes a signer's AR device (e.g., AR device A 110) with a recipient's AR device (e.g., AR device B 114). In block 904, the hand tracking application 406 performs hand tracking and the sign language recognition application 408 performs sign language recognition on the synchronized images. In block 906, the display 304 displays the suggested translation based on sign language recognition on the signer's AR device. In block 908, the sign language recognition application 408 detects confirmation of suggested translation on the signer's AR device. In block 910, the sign language recognition application 408 provides the suggested translation to the recipient's AR device.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 10:
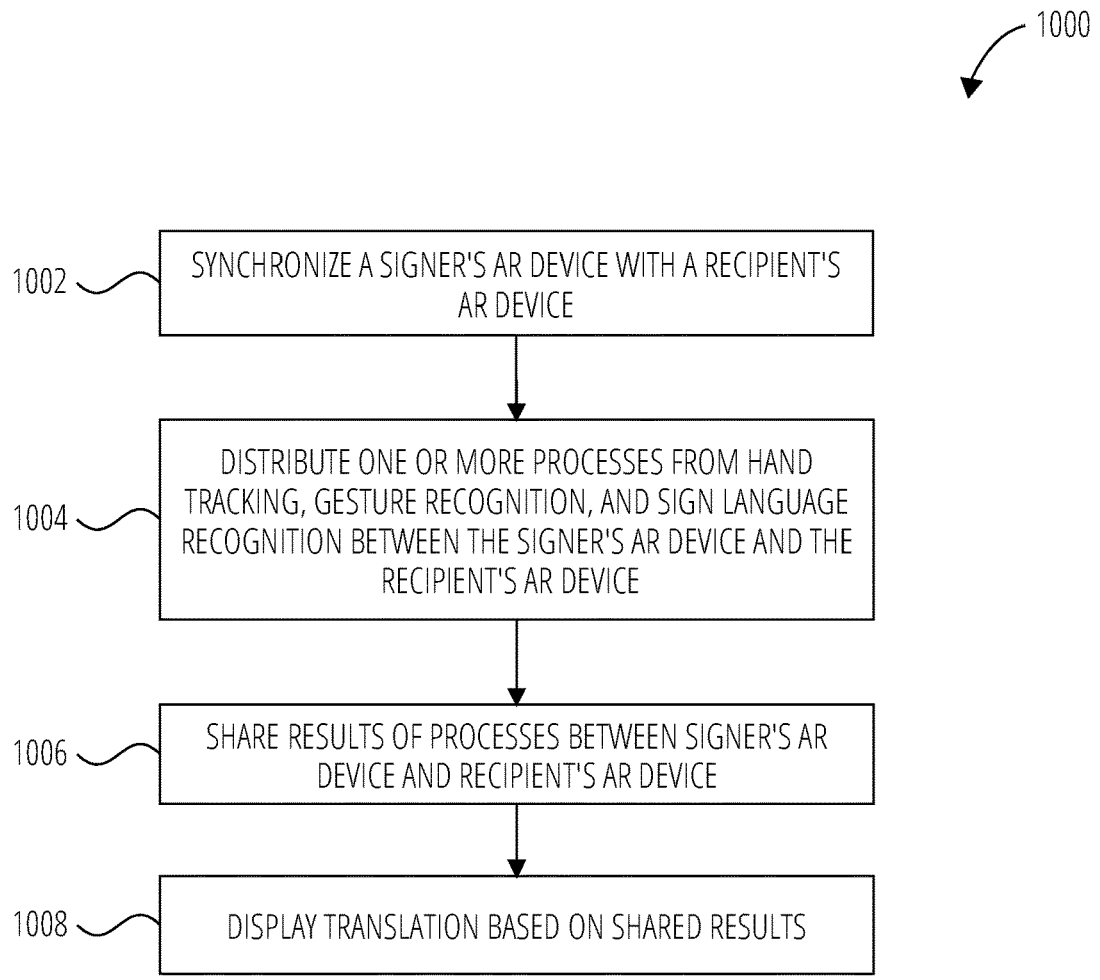
FIG. 10 is a flow diagram illustrating a method for distributing sign language translation processes in accordance with one example embodiment.

FIG. 10 is a flow diagram illustrating a method for distributing sign language translation processes in accordance with one example embodiment. Operations in the method 1000 may be performed by the collaborative sign language system 328, using components (e.g., modules, engines) described above with respect to FIG. 4. Accordingly, the method 1000 is described by way of example with reference to the collaborative sign language system 328. However, it shall be appreciated that at least some of the operations of the method 1000 may be deployed on various other hardware configurations or be performed by similar components residing elsewhere.

In block 1002, the collaborative sign language system 328 synchronizes a signer's AR device with a recipient's AR device. In block 1004, the collaborative sign language system 328 distributes one or more processes from hand tracking, gesture recognition, and sign language recognition between the signer's AR device and the recipient's AR device. In block 1006, the collaborative sign language system 328 shares results of processes between signer's AR device and recipient's AR device. In block 1008, the display 304 displays translation based on shared results.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

System with Head-Wearable Apparatus

Figure 11:
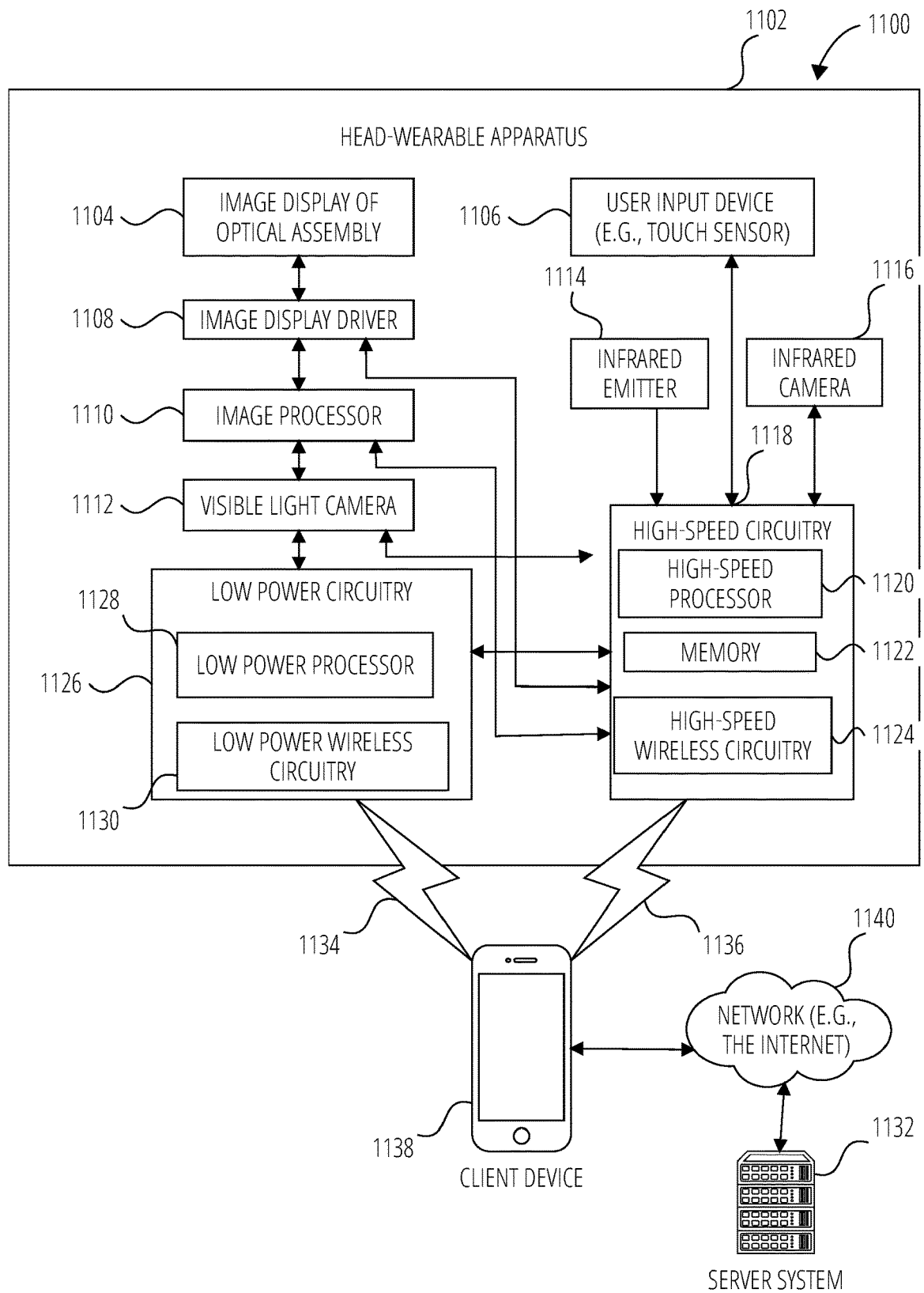
FIG. 11 illustrates a network environment in which a head-wearable device can be implemented according to one example embodiment.

FIG. 11 illustrates a network environment 1100 in which the head-wearable apparatus 1102 can be implemented according to one example embodiment. FIG. 11 is a high-level functional block diagram of an example head-wearable apparatus 1102 communicatively coupled a mobile client device 1138 and a server system 1132 via various network 1140.

head-wearable apparatus 1102 includes a camera, such as at least one of visible light camera 1112, infrared emitter 1114 and infrared camera 1116. The client device 1138 can be capable of connecting with head-wearable apparatus 1102 using both a communication 1134 and a communication 1136. client device 1138 is connected to server system 1132 and network 1140. The network 1140 may include any combination of wired and wireless connections.

The head-wearable apparatus 1102 further includes two image displays of the image display of optical assembly 1104. The two include one associated with the left lateral side and one associated with the right lateral side of the head-wearable apparatus 1102. The head-wearable apparatus 1102 also includes image display driver 1108, image processor 1110, low-power low power circuitry 1126, and high-speed circuitry 1118. The image display of optical assembly 1104 are for presenting images and videos, including an image that can include a graphical user interface to a user of the head-wearable apparatus 1102.

The image display driver 1108 commands and controls the image display of the image display of optical assembly 1104. The image display driver 1108 may deliver image data directly to the image display of the image display of optical assembly 1104 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1102 includes a frame and stems (or temples) extending from a lateral side of the frame. The head-wearable apparatus 1102 further includes a user input device 1106 (e.g., touch sensor or push button) including an input surface on the head-wearable apparatus 1102. The user input device 1106 (e.g., touch sensor or push button) is to receive from the user an input selection to manipulate the graphical user interface of the presented image.

The components shown in FIG. 11 for the head-wearable apparatus 1102 are located on one or more circuit boards, for example a PCB or flexible PCB, in the rims or temples. Alternatively, or additionally, the depicted components can be located in the chunks, frames, hinges, or bridge of the head-wearable apparatus 1102. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1102 includes a memory 1122 which stores instructions to perform a subset or all of the functions described herein. memory 1122 can also include storage device.

As shown in FIG. 11, high-speed circuitry 1118 includes high-speed processor 1120, memory 1122, and high-speed wireless circuitry 1124. In the example, the image display driver 1108 is coupled to the high-speed circuitry 1118 and operated by the high-speed processor 1120 in order to drive the left and right image displays of the image display of optical assembly 1104. high-speed processor 1120 may be any processor capable of managing high-speed communications and operation of any general computing system needed for head-wearable apparatus 1102. The high-speed processor 1120 includes processing resources needed for managing high-speed data transfers on communication 1136 to a wireless local area network (WLAN) using high-speed wireless circuitry 1124. In certain examples, the high-speed processor 1120 executes an operating system such as a LINUX operating system or other such operating system of the head-wearable apparatus 1102 and the operating system is stored in memory 1122 for execution. In addition to any other responsibilities, the high-speed processor 1120 executing a software architecture for the head-wearable apparatus 1102 is used to manage data transfers with high-speed wireless circuitry 1124. In certain examples, high-speed wireless circuitry 1124 is configured to implement Institute of Electrical and Electronic Engineers (IEEE) 1102.11 communication standards, also referred to herein as Wi-Fi. In other examples, other high-speed communications standards may be implemented by high-speed wireless circuitry 1124.

The low power wireless circuitry 1130 and the high-speed wireless circuitry 1124 of the head-wearable apparatus 1102 can include short range transceivers (Bluetooth™) and wireless wide, local, or wide area network transceivers (e.g., cellular or WiFi). The client device 1138, including the transceivers communicating via the communication 1134 and communication 1136, may be implemented using details of the architecture of the head-wearable apparatus 1102, as can other elements of network 1140.

The memory 1122 includes any storage device capable of storing various data and applications, including, among other things, camera data generated by the left and right, infrared camera 1116, and the image processor 1110, as well as images generated for display by the image display driver 1108 on the image displays of the image display of optical assembly 1104. While memory 1122 is shown as integrated with high-speed circuitry 1118, in other examples, memory 1122 may be an independent standalone element of the head-wearable apparatus 1102. In certain such examples, electrical routing lines may provide a connection through a chip that includes the high-speed processor 1120 from the image processor 1110 or low power processor 1128 to the memory 1122. In other examples, the high-speed processor 1120 may manage addressing of memory 1122 such that the low power processor 1128 will boot the high-speed processor 1120 any time that a read or write operation involving memory 1122 is needed.

As shown in FIG. 11, the low power processor 1128 or high-speed processor 1120 of the head-wearable apparatus 1102 can be coupled to the camera (visible light camera 1112; infrared emitter 1114, or infrared camera 1116), the image display driver 1108, the user input device 1106 (e.g., touch sensor or push button), and the memory 1122.

The head-wearable apparatus 1102 is connected with a host computer. For example, the head-wearable apparatus 1102 is paired with the client device 1138 via the communication 1136 or connected to the server system 1132 via the network 1140. server system 1132 may be one or more computing devices as part of a service or network computing system, for example, that include a processor, a memory, and network communication interface to communicate over the network 1140 with the client device 1138 and head-wearable apparatus 1102.

The client device 1138 includes a processor and a network communication interface coupled to the processor. The network communication interface allows for communication over the network 1140, communication 1134 or communication 1136. client device 1138 can further store at least portions of the instructions for generating a binaural audio content in the client device 1138's memory to implement the functionality described herein.

Output components of the head-wearable apparatus 1102 include visual components, such as a display such as a liquid crystal display (LCD), a plasma display panel (PDP), a light emitting diode (LED) display, a projector, or a waveguide. The image displays of the optical assembly are driven by the image display driver 1108. The output components of the head-wearable apparatus 1102 further include acoustic components (e.g., speakers), haptic components (e.g., a vibratory motor), other signal generators, and so forth. The input components of the head-wearable apparatus 1102, the client device 1138, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1102 may optionally include additional peripheral device elements. Such peripheral device elements may include biometric sensors, additional sensors, or display elements integrated with head-wearable apparatus 1102. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1136 from the client device 1138 via the low power wireless circuitry 1130 or high-speed wireless circuitry 1124.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 12:
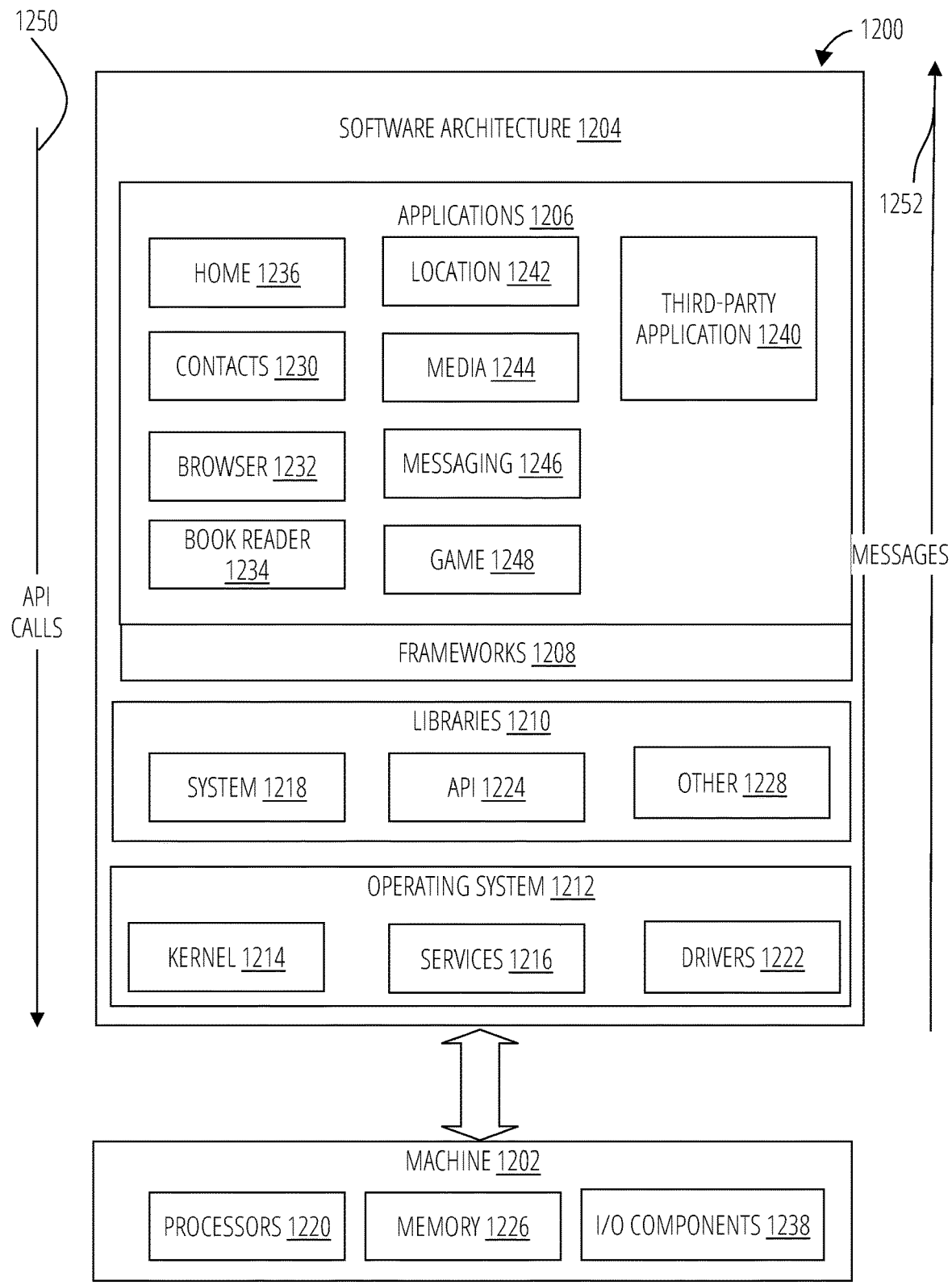
FIG. 12 is block diagram showing a software architecture within which the present disclosure may be implemented, according to an example embodiment.

FIG. 12 is a block diagram 1200 illustrating a software architecture 1204, which can be installed on any one or more of the devices described herein. The software architecture 1204 is supported by hardware such as a machine 1202 that includes Processors 1220, memory 1226, and I/O Components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, Processor management (e.g., scheduling), Component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Figure 13:
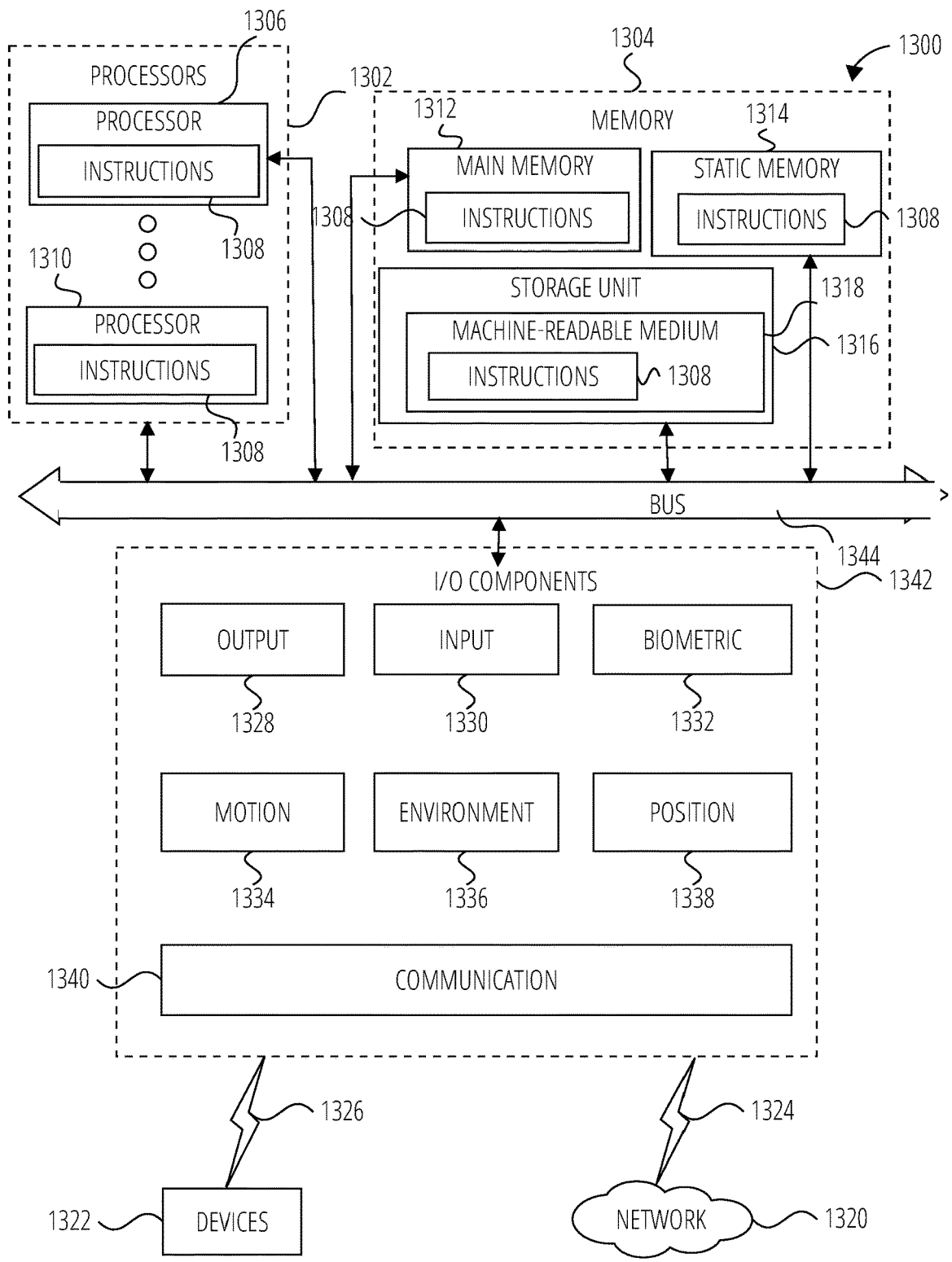
FIG. 13 is a diagrammatic representation of a machine in the form of a computer system within which a set of instructions may be executed for causing the machine to perform any one or more of the methodologies discussed herein, according to one example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include Processors 1302, memory 1304, and I/O Components 1342, which may be configured to communicate with each other via a bus 1344. In an example embodiment, the Processors 1302 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1306 and a Processor 1310 that execute the instructions 1308. The term "Processor" is intended to include multi-core Processors that may comprise two or more independent Processors (sometimes referred to as "cores") that may execute instructions contemporaneously. Although FIG. 13 shows multiple Processors 1302, the machine 1300 may include a single Processor with a single core, a single Processor with multiple cores (e.g., a multi-core Processor), multiple Processors with a single core, multiple Processors with multiples cores, or any combination thereof.

The memory 1304 includes a main memory 1312, a static memory 1314, and a storage unit 1316, both accessible to the Processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the Processors 1302 (e.g., within the Processor's cache memory), or any suitable combination thereof, during execution thereof by the machine 1300.

The I/O Components 1342 may include a wide variety of Components to receive input, provide output, produce output, transmit information, exchange information, capture measurements, and so on. The specific I/O Components 1342 that are included in a particular machine will depend on the type of machine. For example, portable machines such as mobile phones may include a touch input device or other such input mechanisms, while a headless server machine will likely not include such a touch input device. It will be appreciated that the I/O Components 1342 may include many other Components that are not shown in FIG. 13. In various example embodiments, the I/O Components 1342 may include output Components 1328 and input Components 1330. The output Components 1328 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1330 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1342 may include biometric Components 1332, motion Components 1334, environmental Components 1336, or position Components 1338, among a wide array of other Components. For example, the biometric Components 1332 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1334 include acceleration sensor Components (e.g., accelerometer), gravitation sensor Components, rotation sensor Components (e.g., gyroscope), and so forth. The environmental Components 1336 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1338 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1342 further include communication Components 1340 operable to couple the machine 1300 to a network 1320 or devices 1322 via a coupling 1324 and a coupling 1326, respectively. For example, the communication Components 1340 may include a network interface Component or another suitable device to interface with the network 1320. In further examples, the communication Components 1340 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1322 may be another machine or any of a wide variety of peripheral devices (e.g., a peripheral device coupled via a USB).

Moreover, the communication Components 1340 may detect identifiers or include Components operable to detect identifiers. For example, the communication Components 1340 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the Processors 1302) and/or storage unit 1316 may store one or more sets of instructions and data structures (e.g., software) embodying or used by any one or more of the methodologies or functions described herein. These instructions (e.g., the instructions 1308), when executed by Processors 1302, cause various operations to implement the disclosed embodiments.

The instructions 1308 may be transmitted or received over the network 1320, using a transmission medium, via a network interface device (e.g., a network interface Component included in the communication Components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method comprising: accessing a first image generated by a first camera of a first augmented reality device and a second image generated by a second camera of a second augmented reality device, the first image and the second image depicting a hand gesture of a user of the first augmented reality device; synchronizing the first augmented reality device with the second augmented reality device; in response to synchronizing, distributing one or more processes of a sign language recognition system between the first augmented reality device and the second augmented reality device, wherein the one or more processes are performed on a corresponding augmented reality device; collecting results from the one or more processes from the first augmented reality device and from the second augmented reality device; and displaying, in near real-time in a first display of the first augmented reality device or in a second display of the second augmented reality device, text indicating a sign language translation of the hand gesture based on the results.

Example 2 includes the method of example 1, wherein synchronizing the first augmented reality device with the second augmented reality device further comprises: mapping a first timestamp of the first image with a second timestamp of the second image.

Example 3 includes the method of example 1, wherein synchronizing the first augmented reality device with the second augmented reality device further comprises: registering a six-degree-of-freedom coordinate system of the first augmented reality device with a six-degree-of-freedom coordinate system of the second augmented reality device.

Example 4 includes the method of example 1, further comprising: communicating the first image to the second augmented reality device, the first image providing an egocentric view of the hand gesture of the user of the first augmented reality device, and wherein the second augmented reality device is configured to perform the one or more processes of the sign language recognition system on a combination of the first image, a first hand skeleton based on the first image, the second image, and a second hand skeleton based on the second image, wherein the one or more processes of the sign language recognition system comprise: a hand tracking process, a hand gesture detection process, and a sign language translation process.

Example 5 includes the method of example 1, further comprising: identifying a suggested word based on a combination of contextual information of the first augmented reality device, historical inputs of the user of the first augmented reality device, text corpus, and pre-defined terms, wherein the text indicates the suggested word.

Example 6 includes the method of example 5, further comprising: displaying the suggested word in the first display of the first augmented reality device; receiving a confirmation of the suggested word from the user of the first augmented reality device; and in response to receiving the confirmation, providing the suggested word to the second augmented reality device.

Example 7 includes the method of example 6, wherein receiving the confirmation comprising: detecting a pre-defined gesture from the user, the predefined gesture indicating the confirmation.

Example 8 includes the method of example 1, wherein distributing the one or more processes of the sign language recognition system further comprises: temporally or spatially distributing the one or more processes between the first augmented reality device and the second augmented reality device, and wherein a temporal distribution comprises processing alternating frames between the first augmented reality device and the second augmented reality device, wherein a spatial distribution comprises processing a first gesture from a first hand of the user only with the first augmented reality device and a second gesture from a second hand of the user only with the second augmented reality device.

Example 9 includes the method of example 1, wherein distributing the one or more processes of the sign language recognition system further comprises: detecting, by the first augmented reality device, an occlusion of the hand gesture in the first image; and in response to detecting the occlusion, assigning the second augmented reality device to perform the one or more processes based on the second image.

Example 10 includes the method of example 1, wherein the first augmented reality device includes a first head-wearable device, wherein the second augmented reality device includes a mobile hand-held device or a second head-wearable device.

Example 11 is a computing apparatus comprising: a processor; and a memory storing instructions that, when executed by the processor, configure the apparatus to: access a first image generated by a first camera of a first augmented reality device and a second image generated by a second camera of a second augmented reality device, the first image and the second image depicting a hand gesture of a user of the first augmented reality device; synchronize the first augmented reality device with the second augmented reality device; in response to synchronizing, distribute one or more processes of a sign language recognition system between the first augmented reality device and the second augmented reality device, wherein the one or more processes are performed on a corresponding augmented reality device; collect results from the one or more processes from the first augmented reality device and from the second augmented reality device; and display, in near real-time in a first display of the first augmented reality device or in a second display of the second augmented reality device, text indicating a sign language translation of the hand gesture based on the results.

Example 12 includes the computing apparatus of example 11, wherein synchronizing the first augmented reality device with the second augmented reality device further comprises: map a first timestamp of the first image with a second timestamp of the second image.

Example 13 includes the computing apparatus of example 11, wherein synchronizing the first augmented reality device with the second augmented reality device further comprises: register a six-degree-of-freedom coordinate system of the first augmented reality device with a six-degree-of-freedom coordinate system of the second augmented reality device.

Example 14 includes the computing apparatus of example 11, wherein the instructions further configure the apparatus to: communicate the first image to the second augmented reality device, the first image providing an egocentric view of the hand gesture of the user of the first augmented reality device, and wherein the second augmented reality device is configured to perform the one or more processes of the sign language recognition system on a combination of the first image, a first hand skeleton based on the first image, the second image, and a second hand skeleton based on the second image, wherein the one or more processes of the sign language recognition system comprise: a hand track process, a hand gesture detection process, and a sign language translation process.

Example 15 includes the computing apparatus of example 11, wherein the instructions further configure the apparatus to: identify a suggested word based on a combination of contextual information of the first augmented reality device, historical inputs of the user of the first augmented reality device, text corpus, and pre-defined terms, wherein the text indicates the suggested word.

Example 16 includes the computing apparatus of example 15, wherein the instructions further configure the apparatus to: display the suggested word in the first display of the first augmented reality device; receive a confirmation of the suggested word from the user of the first augmented reality device; and in response to receiving the confirmation, provide the suggested word to the second augmented reality device.

Example 17 includes the computing apparatus of example 16, wherein receiving the confirmation comprising: detect a predefined gesture from the user, the predefined gesture indicating the confirmation.

Example 18 includes the computing apparatus of example 11, wherein distributing the one or more processes of the sign language recognition system further comprises: temporally or spatially distribute the one or more processes between the first augmented reality device and the second augmented reality device, and wherein a temporal distribution comprises process alternating frames between the first augmented reality device and the second augmented reality device, wherein a spatial distribution comprises process a first gesture from a first hand of the user only with the first augmented reality device and a second gesture from a second hand of the user only with the second augmented reality device.

Example 19 includes the computing apparatus of example 11, wherein distributing the one or more processes of the sign language recognition system further comprises: detect, by the first augmented reality device, an occlusion of the hand gesture in the first image; and in response to detecting the occlusion, assign the second augmented reality device to perform the one or more processes based on the second image.

Example 20 is a non-transitory computer-readable storage medium, the computer-readable storage medium including instructions that when executed by a computer, cause the computer to: access a first image generated by a first camera of a first augmented reality device and a second image generated by a second camera of a second augmented reality device, the first image and the second image depicting a hand gesture of a user of the first augmented reality device; synchronize the first augmented reality device with the second augmented reality device; in response to synchronizing, distribute one or more processes of a sign language recognition system between the first augmented reality device and the second augmented reality device, wherein the one or more processes are performed on a corresponding augmented reality device; collect results from the one or more processes from the first augmented reality device and from the second augmented reality device; and display, in near real-time in a first display of the first augmented reality device or in a second display of the second augmented reality device, text indicating a sign language translation of the hand gesture based on the results.

Described implementations of the subject matter can include one or more features, alone or in combination as illustrated below by way of example.

What is claimed is:

1. A method comprising:
accessing a first image generated by a first camera of a first augmented reality device and a second image generated by a second camera of a second augmented reality device, the first image and the second image depicting a hand gesture of a user of the first augmented reality device;
synchronizing the first augmented reality device with the second augmented reality device by mapping first image metadata of the first image with second image metadata of the second image;
generating synchronized information that comprises the first image metadata, the first image, first pose data of the first augmented reality device, the second image metadata, the second image, and second pose data of the second augmented reality device;
in response to synchronizing, distributing one or more processes of a sign language recognition system between the first augmented reality device and the second augmented reality device by sharing the synchronized information between the first augmented reality device and the second augmented reality device, wherein the one or more processes are performed on a corresponding augmented reality device;
collecting results from the one or more processes from the first augmented reality device and from the second augmented reality device; and
displaying, in near real-time in a first display of the first augmented reality device or in a second display of the second augmented reality device, text indicating a sign language translation of the hand gesture based on the results.

2. The method of claim 1, wherein synchronizing the first augmented reality device with the second augmented reality device further comprises: mapping a first timestamp of the first image with a second timestamp of the second image.

3. The method of claim 1, wherein synchronizing the first augmented reality device with the second augmented reality device further comprises: registering a six-degree-of-freedom coordinate system of the first augmented reality device with a six-degree-of-freedom coordinate system of the second augmented reality device.

4. The method of claim 1, further comprising:
communicating the first image to the second augmented reality device, the first image providing an egocentric view of the hand gesture of the user of the first augmented reality device, and
wherein the second augmented reality device is configured to perform the one or more processes of the sign language recognition system on a combination of the first image, a first hand skeleton based on the first image, the second image, and a second hand skeleton based on the second image,
wherein the one or more processes of the sign language recognition system comprise: a hand tracking process, a hand gesture detection process, and a sign language translation process.

5. The method of claim 1, further comprising:
identifying a suggested word based on a combination of contextual information of the first augmented reality device, historical inputs of the user of the first augmented reality device, text corpus, and pre-defined terms,
wherein the text indicates the suggested word.

6. The method of claim 5, further comprising:
displaying the suggested word in the first display of the first augmented reality device;
receiving a confirmation of the suggested word from the user of the first augmented reality device; and
in response to receiving the confirmation, providing the suggested word to the second augmented reality device.

7. The method of claim 6, wherein receiving the confirmation comprising:
detecting a predefined gesture from the user, the predefined gesture indicating the confirmation.

8. The method of claim 1, wherein distributing the one or more processes of the sign language recognition system further comprises:
  temporally or spatially distributing the one or more processes between the first augmented reality device and the second augmented reality device, and
  wherein a temporal distribution comprises processing alternating frames between the first augmented reality device and the second augmented reality device,
  wherein a spatial distribution comprises processing a first gesture from a first hand of the user only with the first augmented reality device and a second gesture from a second hand of the user only with the second augmented reality device.

9. The method of claim 1, wherein distributing the one or more processes of the sign language recognition system further comprises:
  detecting, by the first augmented reality device, an occlusion of the hand gesture in the first image; and
  in response to detecting the occlusion, assigning the second augmented reality device to perform the one or more processes based on the second image.

10. The method of claim 1, wherein the first augmented reality device includes a first head-wearable device, wherein the second augmented reality device includes a mobile hand-held device or a second head-wearable device.

11. A computing apparatus comprising:
  a processor; and
  a memory storing instructions that, when executed by the processor, configure the apparatus to:
  access a first image generated by a first camera of a first augmented reality device and a second image generated by a second camera of a second augmented reality device, the first image and the second image depicting a hand gesture of a user of the first augmented reality device;
  synchronize the first augmented reality device with the second augmented reality device by mapping first metadata of the first image with second metadata of the second image;
  generate synchronized information that comprises the first metadata, the first image, the second metadata, and the second image;
  in response to synchronizing, distribute one or more processes of a sign language recognition system between the first augmented reality device and the second augmented reality device by sharing a portion of the synchronized information between the first augmented reality device and the second augmented reality device, wherein the one or more processes are performed on a corresponding augmented reality device;
  collect results from the one or more processes from the first augmented reality device and from the second augmented reality device; and
  display, in near real-time in a first display of the first augmented reality device or in a second display of the second augmented reality device, text indicating a sign language translation of the hand gesture based on the results.

12. The computing apparatus of claim 11, wherein synchronizing the first augmented reality device with the second augmented reality device further comprises: map a first timestamp of the first image with a second timestamp of the second image.

13. The computing apparatus of claim 11, wherein synchronizing the first augmented reality device with the second augmented reality device further comprises: register a six-degree-of-freedom coordinate system of the first augmented reality device with a six-degree-of-freedom coordinate system of the second augmented reality device.

14. The computing apparatus of claim 11, wherein the instructions further configure the apparatus to:
  communicate the first image to the second augmented reality device, the first image providing an egocentric view of the hand gesture of the user of the first augmented reality device, and
  wherein the second augmented reality device is configured to perform the one or more processes of the sign language recognition system on a combination of the first image, a first hand skeleton based on the first image, the second image, and a second hand skeleton based on the second image,
  wherein the one or more processes of the sign language recognition system comprise: a hand track process, a hand gesture detection process, and a sign language translation process.

15. The computing apparatus of claim 11, wherein the instructions further configure the apparatus to:
  identify a suggested word based on a combination of contextual information of the first augmented reality device, historical inputs of the user of the first augmented reality device, text corpus, and pre-defined terms,
  wherein the text indicates the suggested word.

16. The computing apparatus of claim 15, wherein the instructions further configure the apparatus to:
  display the suggested word in the first display of the first augmented reality device;
  receive a confirmation of the suggested word from the user of the first augmented reality device; and
  in response to receiving the confirmation, provide the suggested word to the second augmented reality device.

17. The computing apparatus of claim 16, wherein receiving the confirmation comprising:
  detect a predefined gesture from the user, the predefined gesture indicating the confirmation.

18. The computing apparatus of claim 11, wherein distributing the one or more processes of the sign language recognition system further comprises:
  temporally or spatially distribute the one or more processes between the first augmented reality device and the second augmented reality device, and
  wherein a temporal distribution comprises process alternating frames between the first augmented reality device and the second augmented reality device,
  wherein a spatial distribution comprises process a first gesture from a first hand of the user only with the first augmented reality device and a second gesture from a second hand of the user only with the second augmented reality device.

19. The computing apparatus of claim 11, wherein distributing the one or more processes of the sign language recognition system further comprises:
  detect, by the first augmented reality device, an occlusion of the hand gesture in the first image; and
  in response to detecting the occlusion, assign the second augmented reality device to perform the one or more processes based on the second image.

20. A non-transitory computer-readable storage medium, the computer-readable storage medium including instructions that when executed by a computer, cause the computer to:
  access a first image generated by a first camera of a first augmented reality device and a second image generated by a second camera of a second augmented reality device, the first image and the second image depicting a hand gesture of a user of the first augmented reality device;

synchronize the first augmented reality device with the second augmented reality device by mapping first metadata of the first image with second metadata of the second image;

generate synchronized information that comprises a combination of the first metadata, the first image, the second metadata, and the second image;

in response to synchronizing, distribute one or more processes of a sign language recognition system between the first augmented reality device and the second augmented reality device by sharing the synchronized information between the first augmented reality device and the second augmented reality device, wherein the one or more processes are performed on a corresponding augmented reality device;

collect results from the one or more processes from the first augmented reality device and from the second augmented reality device; and display, in near real-time in a first display of the first augmented reality device or in a second display of the second augmented reality device, text indicating a sign language translation of the hand gesture based on the results.

* * * * *